(12) United States Patent
Bizet et al.

(10) Patent No.: US 12,325,807 B2
(45) Date of Patent: Jun. 10, 2025

(54) FLUOROPOLYMER POWDER ADAPTED FOR RAPID PROTOTYPING BY LASER SINTERING

(71) Applicant: ARKEMA FRANCE, Colombes (FR)

(72) Inventors: Stephane Bizet, Barc (FR); Julien Le Boterff, Lille (FR)

(73) Assignee: Arkema France, Colombes (FR)

( * ) Notice: Subject to any disclaimer, the term of this patent is extended or adjusted under 35 U.S.C. 154(b) by 1349 days.

(21) Appl. No.: 16/958,817

(22) PCT Filed: Jan. 15, 2019

(86) PCT No.: PCT/FR2019/050074
§ 371 (c)(1),
(2) Date: Dec. 7, 2020

(87) PCT Pub. No.: WO2019/138201
PCT Pub. Date: Jul. 18, 2019

(65) Prior Publication Data
US 2023/0183494 A1    Jun. 15, 2023

(30) Foreign Application Priority Data
Jan. 15, 2018  (FR) ..................................... 1850295

(51) Int. Cl.
| | | |
|---|---|---|
| *C09D 7/61* | (2018.01) | |
| *B33Y 10/00* | (2015.01) | |
| *B33Y 70/00* | (2020.01) | |
| *C08F 14/18* | (2006.01) | |
| *C08K 3/01* | (2018.01) | |
| *C08K 3/36* | (2006.01) | |
| *C09D 5/03* | (2006.01) | |
| *C09D 127/12* | (2006.01) | |
| *B29K 27/00* | (2006.01) | |

(52) U.S. Cl.
CPC .............. *C09D 5/037* (2013.01); *B33Y 70/00* (2014.12); *C08F 14/185* (2013.01); *C08K 3/01* (2018.01); *C08K 3/36* (2013.01); *C09D 5/031* (2013.01); *C09D 7/61* (2018.01); *C09D 127/12* (2013.01); *B29K 2027/16* (2013.01); *B33Y 10/00* (2014.12)

(58) Field of Classification Search
CPC .......... C09D 5/037; C09D 7/61; C09D 5/031; C09D 127/12; C08F 14/185; C08K 3/36; C08K 3/01; B33Y 10/00; B33Y 70/00; B29K 2027/16
USPC ......................................................... 524/405
See application file for complete search history.

(56) References Cited

U.S. PATENT DOCUMENTS

| | | | |
|---|---|---|---|
| 2013/0052453 A1 | 2/2013 | Filou et al. | |
| 2017/0321034 A1* | 11/2017 | Iwata | C08J 3/20 |
| 2018/0237627 A1 | 8/2018 | Liu et al. | |
| 2018/0244862 A1* | 8/2018 | Price | B33Y 70/10 |

FOREIGN PATENT DOCUMENTS

WO    2007133912 A2    11/2007

* cited by examiner

*Primary Examiner* — Kelechi C Egwim
(74) *Attorney, Agent, or Firm* — Joanne Rossi

(57) ABSTRACT

The invention relates to a composition based on a thermoplastic fluoropolymer powder, in particular on polyvinylidene fluoride (PVDF) with improved flowability, particularly suitable for manufacturing parts by 3D laser sintering. The invention also relates to a method for agglomerating powder layer by layer, by melting or sintering using said composition. The invention finally relates to a three-dimensional article obtained by implementing said method.

15 Claims, No Drawings

FLUOROPOLYMER POWDER ADAPTED FOR RAPID PROTOTYPING BY LASER SINTERING

CROSS-REFERENCE TO RELATED APPLICATIONS

This application is a national stage application under 35 U.S.C. § 371 of, and claims priority to PCT Application Number PCT/FR2019/050074, filed Jan. 15, 2019; and French National U.S. Pat. No. 1,850,295, filed Jan. 15, 2018; said applications are incorporated herein by reference.

FIELD OF THE INVENTION

The present invention relates to a composition based on thermoplastic fluoropolymer powder, notably based on poly(vinylidene fluoride) (PVDF) with improved flowability, which is more particularly suitable for manufacturing parts via the 3D laser sintering process. The invention also relates to a process for agglomeration of powder, layer by layer, by melting or sintering using said composition. The invention lastly relates to a three-dimensional object obtained by performing this process.

TECHNICAL BACKGROUND

The agglomeration of powders by melting (hereinafter referred to as "sintering") is obtained by radiation, for instance a laser beam (laser sintering), infrared radiation, UV radiation, or any source of electromagnetic radiation which makes it possible to melt the powder layer by layer to manufacture objects. Laser-beam powder sintering technology is used to manufacture three-dimensional objects, such as prototypes or models but also functional parts, in particular in the motor vehicle, nautical, aeronautical, aerospace, medical (prostheses, auditory systems, cell tissues, and the like), textile, clothing, fashion, decorative, electronic casing, telephony, home automation, computing or lighting fields.

A thin layer of powder of the polymer in question is deposited on a horizontal plate maintained in a chamber heated to a certain temperature. The laser supplies the energy required to fuse the powder particles at various points of the layer of powder in a geometry corresponding to the object, for example using a computer that stores the shape of the object and that reproduces this shape in the form of slices. Next, the horizontal plate is lowered by a value corresponding to the thickness of one layer of powder (for example between 0.05 and 2 mm and generally of the order of 0.1 mm), then a new layer of powder is deposited. This layer of powder is at a temperature referred to hereinbelow as the powder bed temperature (or bed temperature). The laser supplies the energy required to fuse the powder particles in a geometry corresponding to this new slice of the object and so on. The procedure is repeated until the entire object has been manufactured. Besides the fusing of the powder particles induced by the energy supplied by the laser, it is necessary to use conditions that enable the coalescence of the particles with each other and good adhesion/coalescence of the layers with each other so that the mechanical properties of the objects manufactured are maximized.

WO 2007/133912 describes a process for manufacturing three-dimensional objects from fluoropolymer powders by laser sintering. The fluoropolymer powders used in this process comprise polymers based on vinylidene fluoride or chlorotrifluoroethylene, and may include an acrylic or methacrylic polymer. They may contain up to 10% by weight of additives such as glass powder. However, no examples are provided showing the properties of the powders used or of the objects obtained.

Moreover, the sintering of PVDF, as described in the publication by Wei Huang et al. "*Microstructure, mechanical, and biological properties of porous poly(vinylidene fluoride) scaffolds fabricated by selective laser sintering*", International Journal of Polymer Science, Vol. 2015, Article ID 132965, leads to a large decrease in the crystallinity of the sintered parts, which is the sign of degradation of the PVDF under the action of the laser.

The publication by Tarasova E. et al. "*Layering laser-assisted sintering of functional graded porous PZT ceramoplasts*", Phase Transitions, 2013, vol. 86, No. 11, pages 1121-1129 describes the manufacture by laser sintering of PVDF-lead zirconate titanate (PZT) composite parts to obtain piezoelectric properties. It mentions the fact that PVDF becomes at least partly crosslinked under the laser, which is a sign of its degradation.

There is thus a need for a fluoropolymer powder which has properties that are suitable for laser sintering, making it possible to obtain good-quality sintered parts without undergoing degradation during sintering.

SUMMARY OF THE INVENTION

The invention relates firstly to a composition in powder form comprising a thermoplastic fluoropolymer and a flow agent.

The fluoropolymer contains in its chain at least one monomer chosen from compounds containing a vinyl group capable of opening in order to polymerize and which contains, directly attached to this vinyl group, at least one fluorine atom, a fluoroalkyl group or a fluoroalkoxy group.

According to one embodiment, the fluoropolymer is a polymer comprising units derived from vinylidene fluoride, and is preferably chosen from polyvinylidene fluoride homopolymer and copolymers comprising vinylidene fluoride units and units derived from at least one other comonomer that is copolymerizable with vinylidene fluoride.

According to one embodiment, the fluoropolymer has a viscosity of less than or equal to 1600 Pa·s, preferably of less than or equal to 1000 Pa·s, at a temperature of 232° C. and at a shear rate of 100 $s^{-1}$.

The composition of the invention further comprises a flow agent in an amount sufficient for the composition to flow and to form a flat layer, notably during a layer-by-layer sintering process.

The flow agent is chosen, for example, from: precipitated silicas, fumed silicas, vitreous silicas, pyrogenic silicas, vitreous phosphates, vitreous borates, vitreous oxides, amorphous alumina, titanium dioxide, talc, mica, kaolin, attapulgite, calcium silicates, alumina and magnesium silicates. According to one embodiment, the flow agent is a hydrophobic silica.

A subject of the present invention is also the use of a thermoplastic powder composition as defined previously, in a sintering process for manufacturing a three-dimensional object.

A subject of the present invention is notably a process for manufacturing a three-dimensional object, comprising the layer-by-layer sintering of a powder with a composition according to the invention.

Finally, the present invention relates to a three-dimensional object that can be manufactured according to the process described previously.

The present invention makes it possible to overcome the drawbacks of the prior art. It provides a fluoropolymer powder with good flowability and a bulk density increased by additivation of silica. It more particularly provides a composition having a good flowability and the good density enabling use thereof via the process of sintering under electromagnetic radiation. This is accomplished by means of the combination between a fluoropolymer and a hydrophobic flow agent, preferentially a hydrophobic fumed silica. Furthermore, the suitable viscosity of the fluoropolymer of the invention allows good coalescence of the powder grains during the sintering process and also good adhesion/cohesion between the successive molten layers of polymer. The fluoropolymer is chosen with respect to its viscosity which should be low enough to facilitate the coalescence and the inter-diffusion of the chains between layers at the temperature of the powder bath. The criterion of choice for the fluoropolymer may thus be the viscosity at zero shear gradient at the powder bed temperature, which is typically of the order of 150° C. for PVDF. The fact of having good flowability, a good density and a good-quality powder bed, and a suitable viscosity of the polymer makes it possible to work under standard process conditions (energy density of the laser, number of passes of the laser per layer) without running the risk of degrading the fluoropolymer and generating hydrofluoric acid during the manufacture of the part.

It is particularly suitable for the manufacture of three-dimensional objects.

DESCRIPTION OF EMBODIMENTS OF THE INVENTION

The invention is now described in greater detail and in a nonlimiting manner in the description that follows.

According to a first aspect, the invention relates to a pulverulent composition comprising a thermoplastic fluoropolymer and a flow agent.

According to various embodiments, said composition comprises the following features, combined where appropriate.

The invention is based first on the use of a fluoropolymer. The term "fluoropolymer" means a polymer including —F groups. The fluoropolymer contains in its chain at least one monomer chosen from the compounds containing a vinyl group capable of opening in order to polymerize and which contains, directly attached to this vinyl group, at least one fluorine atom, a fluoroalkyl group or a fluoroalkoxy group. Examples of monomers that may be mentioned include vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers such as perfluoro(methyl vinyl) ether (PMVE), perfluoro(ethyl vinyl) ether (PEVE) and perfluoro(propyl vinyl) ether (PPVE); perfluoro(1,3-dioxole); perfluoro(2,2-dimethyl-1,3-dioxole) (PDD); the product of formula CF2=CFOCF2CF(CF3)OCF2CF2X in which X is SO2F, CO2H, CH2OH, CH2OCN or CH2OPO3H; the product of formula CF2=CFOCF2CF2SO2F; the product of formula F(CF2)nCH2OCF=CF2 in which n is 1, 2, 3, 4 or 5; the product of formula R1CH2OCF=CF2 in which R1 is hydrogen or F(CF2)m and m is equal to 1, 2, 3 or 4; the product of formula R2OCF=CH2 in which R2 is F(CF2)p and p is 1, 2, 3 or 4; perfluorobutyl ethylene (PFBE); 3,3,3-trifluoropropene and 2-trifluoromethyl-3,3,3-trifluoro-1-propene.

The fluoropolymer may be a homopolymer or a copolymer; it may also comprise non-fluoro monomers such as ethylene.

According to one embodiment, the fluoropolymer is a homopolymer of one of the following monomers: vinyl fluoride, vinylidene fluoride, chlorotrifluoroethylene or tetrafluoroethylene.

According to one embodiment, the fluoropolymer is chosen from copolymers of ethylene and chlorotrifluoroethylene, of ethylene and tetrafluoroethylene, of hexafluoropropylene and tetrafluoroethylene, of tetrafluoroethylene and a monomer from the family of perfluoro(alkyl vinyl) ethers.

According to one embodiment, the fluoropolymer is a polymer comprising units derived from vinylidene fluoride and is preferably chosen from polyvinylidene fluoride homopolymer and copolymers comprising vinylidene fluoride units and units derived from at least one other comonomer chosen from: vinyl fluoride; trifluoroethylene; chlorotrifluoroethylene; 1,2-difluoroethylene; tetrafluoroethylene; hexafluoropropylene; perfluoro(alkyl vinyl) ethers such as perfluoro(methyl vinyl) ether, perfluoro(ethyl vinyl) ether and perfluoro(propyl vinyl) ether; perfluoro(1,3-dioxole); perfluoro(2,2-dimethyl-1,3-dioxole), and mixtures thereof. Preferably, the fluoro comonomer is chosen from chlorotrifluoroethylene, hexafluoropropylene, trifluoroethylene and tetrafluoroethylene, and mixtures thereof. In one variant, the copolymer comprises only VDF and hexafluoropropylene (HFP). More particularly preferably, the copolymers contain at least 50 mol % of units derived from vinylidene fluoride, and even more preferably at least 75 mol % of units derived from vinylidene fluoride.

According to one embodiment, the fluoropolymer is a terpolymer of ethylene, hexafluoropropylene and tetrafluoroethylene, or a terpolymer of tetrafluoroethylene, vinylidene fluoride and hexafluoropropylene.

The term "thermoplastic" means here a nonelastomeric polymer. An elastomeric polymer is defined as being a polymer which can be drawn, at room temperature, to twice its initial length and which, after releasing the stresses, rapidly resumes its initial length, to within about 10%, as indicated by the ASTM in the Special Technical Publication, No. 184.

According to one embodiment, the fluoropolymer has a viscosity of less than or equal to 1600 Pa·s, preferably of less than or equal to 1000 Pa·s, at a temperature of 232° C. and at a shear rate of 100 s$^{-1}$. The viscosity is measured at 232° C., at a shear rate of 100 s$^{-1}$, using a capillary rheometer or a parallel-plate rheometer, according to the standard ASTM According to one embodiment, which may be combined with the one described in the preceding paragraph, the fluoropolymer has a viscosity at zero shear gradient at the powder bed temperature of less than or equal to 75 000 Pa·s, preferentially less than 25 000 Pa·s and even more preferentially less than 15 000 Pa·s. The method used for measuring the viscosity at zero shear gradient at the powder bed temperature is the following. The viscosity is measured using a plate/plate rheometer at three temperatures, above the melting temperature of the fluoropolymer. Typically, the viscosity is measured at three temperatures T1, T2, T3 such that T1<T2<T3 and T1 is above the melting temperature of the fluoropolymer. At each temperature, the viscosity is measured over a range of angular frequencies. For a given temperature, the viscosity becomes independent of the angular frequency below a critical angular frequency and reaches a plateau which corresponds to the value of the viscosity at zero shear gradient. The temperature T1 and the measurement range of angular frequencies are chosen so as to achieve the viscosity at zero shear gradient. The viscosity at zero shear gradient at the powder bed temperature is then obtained by extrapolation of the straight line representing the logarithm of the viscosity at zero shear gradient as a function of the reciprocal of the temperature in degrees Kelvin. For example, in the case where the fluoropolymer is a vinylidene fluoride homopolymer or a copolymer of vinylidene fluoride and hexafluoropropylene, the temperatures typically chosen for the viscosity measurement are 190° C., 210° C., 230° C. and the angular frequencies are typically between 0.1 rad/s and 100 rad/s.

In the case where the fluoropolymer is polyvinylidene fluoride, the fluoropolymer may be a blend of two or more vinylidene fluoride homopolymers having different viscosities. The viscosity of the blend, measured at 232° C. and 100 s-1, is less than or equal to 1600 Pa·s.

In the case where the fluoropolymer is a copolymer of vinylidene fluoride and at least one other comonomer listed above, the fluoropolymer may be a blend of two or more copolymers of different viscosities. The viscosity of the blend, measured at 232° C. and 100 s-1, is less than or equal to 1600 Pa·s.

The fluoropolymer powder has a particle size defined by a Dv50 of less than or equal to 120 µm, preferentially between 25 and 100 micrometers.

The Dv50 referred to here is the median diameter by volume, which corresponds to the value of the particle size which divides the population of particles examined exactly into two. The Dv50 is measured according to the standard ISO 9276—parts 1 to 6. In the present description, a Malvern Insitec System particle size analyzer is used and the measurement is performed by the dry route by laser diffraction on the powder.

In addition to the Dv50, the particle size distribution may be characterized by the Dv10 and the Dv90. The Dv10 represents the diameter for which 10% by volume of the population of particles has a smaller diameter. The Dv90 represents the diameter for which 90% by volume of the population of particles has a smaller diameter. Thus, the Dv90 of the powder of the invention is less than or equal to 200 µm, preferentially less than or equal to 150 µm and even more preferentially less than or equal to 125 µm. The Dv10 of the powder of the invention is less than or equal to 50 µm, preferentially less than or equal to 40 µm and even more preferentially less than or equal to 25 µm. The Dv10 and Dv90 are measured according to the standard ISO 9276—parts 1 to 6. As for the Dv50, in the present description, a Malvern Insitec System particle size analyzer is used and the measurement is performed by the dry route by laser diffraction on the powder.

The fluoropolymer used in the invention can be obtained by known polymerization methods, such as solution, emulsion or suspension polymerization. According to one embodiment, it is prepared by an emulsion polymerization process in the absence of a fluorinated surfactant.

The fluoropolymer used in the invention preferably has a number-average molecular mass ranging from 5 kDa to 200 kDa, preferably from 5 kDa to 150 kDa and even more preferentially from 5 kDa to 120 kDa, as measured by size exclusion chromatography in DMSO/0.1 M NaNO3 with polymethyl methacrylate as calibration standard.

Such a fluoropolymer of low molecular mass may notably be obtained by using a high content of one or more chain-transfer agents during the polymerization process. According to one embodiment, chain-transfer agents that are suitable for this purpose are chosen from:

short-chain hydrocarbons, such as ethane and propane,
esters, such as ethyl acetate and diethyl maleate,
alcohols, carbonates, ketones,
halocarbons and hydrohalocarbons, such as chlorocarbons, hydrochlorocarbons, chlorofluorocarbons and hydrochlorofluorocarbons,
organic solvents, when they are added to an emulsion or suspension polymerization reaction.

Other factors which promote the production of low molecular weight polymers are the implementation of the polymerization reaction at high temperatures or the use of high levels of initiator.

The fluoropolymer used in the invention, when it is a copolymer, may be homogeneous or heterogeneous, and preferably homogeneous. A homogeneous polymer has a uniform chain structure, the statistical distribution of the comonomers not varying between the polymer chains. A homogeneous copolymer may be prepared by a one-step process, in which the comonomers are gradually injected while the mass ratio between them is kept constant. In a heterogeneous polymer, the polymer chains have an average comonomer content distribution of multimodal or spread-out type; it thus comprises polymer chains rich in a comonomer and polymer chains poor in said comonomer. An example of heterogeneous PVDF appears in WO 2007/080338.

The composition of the invention further comprises a flow agent in an amount sufficient for the composition to flow and to form a flat layer, notably during a layer-by-layer sintering process.

The flow agent is chosen, for example, from: precipitated silicas, fumed silicas, vitreous silicas, pyrogenic silicas, vitreous phosphates, vitreous borates, vitreous oxides, amorphous alumina, titanium dioxide, talc, mica, kaolin, attapulgite, calcium silicates, alumina and magnesium silicates. Furthermore, preferentially, the flow agent has undergone a chemical surface modification so as to give it a hydrophobic character. For example, the flow agent is a hydrophobic fumed silica.

The flow agent has a particle size such that the Dv50 is less than 20 µm.

According to one embodiment, the flow agent is a hydrophobic silica. The silica may be rendered hydrophobic by grafting hydrophobic groups onto the silanol functions present at the surface. It has been shown that a hydrophilic silica (not surface-treated) would not improve the flow properties of a PVDF powder. Without addition of silica, the PVDF powder does not flow well enough to be able to be sintered.

To obtain improved flowability of the fluoropolymer during the sintering process, it is necessary to use an optimum content of flow agent, which depends on the nature of this flow agent and the particle size distribution thereof.

It has been observed that a fluoropolymer powder additivated with 0.4% of hydrophobic silica has flowability greater than that of a non-additivated powder, but lower than that of a powder additivated with 0.2% of silica. The powder additivated with 0.4% of hydrophobic silica may still be "sintered" but the sintering window of the powder is narrower, i.e. the powder bed temperature range which allows correct sintering of the powder becomes very narrow and difficult to zero in on.

The composition of the invention comprises a content of flow agent ranging from 0.01% to 5% by weight of the composition, preferably ranging from 0.025% to 1%.

Preferably, the flow agent is of spherical shape.

According to one embodiment, the composition of the invention consists of a fluoropolymer and a flow agent, as described.

According to another embodiment, the composition of the invention further comprises at least one additive suitable for the polymer powders used in sintering, notably chosen from additives that help to improve the properties of the powder for the use thereof in agglomeration technology and/or additives for improving the mechanical (breaking stress and elongation at break) or esthetic (color) properties of the objects obtained by melting. The composition of the invention may notably comprise dyes, pigments for coloring, pigments for infrared absorption, carbon black, fire-retardant additives, glass fibers, carbon fibers, etc. These additives are in powder form with a Dv50 of less than 20 μm. The compositions of the invention may also contain at least one additive chosen from antioxidant stabilizers, light stabilizers, impact modifiers, antistatic agents and flame retardants, and mixtures thereof. The total content of additives is less than or equal to 50% by weight of the composition.

The fluoropolymer powder may be obtained by various processes. The powder may be obtained directly by an emulsion or suspension synthetic process by drying by spray-drying or by freeze-drying. The powder may also be obtained by milling techniques, such as cryomilling. The fluoropolymer powder has a particle size characterized by a diameter Dv50 of less than or equal to 120 μm. At the end of the powder manufacturing step, the particle size can be adjusted and optimized for the process of sintering under electromagnetic radiation by selection or screening methods.

The flow agent is added to the fluoropolymer powder and mixed. When the composition also comprises an additive, this additive is added in the melt state using conventional means for mixing thermoplastic polymers such as co-rotating or counter-rotating double-screw or single-screw extruders or co-kneaders.

A subject of the present invention is also the use of a thermoplastic powder composition as defined previously, in a sintering process for manufacturing a three-dimensional object.

A subject of the present invention is notably a process for manufacturing a three-dimensional object, comprising the layer-by-layer sintering of a powder with a composition according to the invention. According to one embodiment, said process uses laser sintering, the principles of which are described in U.S. Pat. No. 6,136,948, WO 96/06881 and US 20040138363, and comprises the following steps:

a) depositing a thin layer of powder of the fluoropolymer composition on a horizontal plate maintained in a chamber heated to a certain temperature;

b) melting, via the energy supplied by a laser, the powder particles at various points in the layer of powder in a geometry corresponding to the object, for example using a computer that stores the shape of the object and that reproduces this shape in the form of slices;

c) lowering the horizontal plate by a value corresponding to the thickness of one layer of powder, for example between 0.05 and 2 mm and generally of the order of 0.1 mm;

d) depositing a new layer of powder. This layer is at a temperature referred to as the powder bed temperature (or bed temperature);

e) melting this new layer by the energy supplied by the laser in a geometry corresponding to this new slice of the object;

f) repeating the procedure of steps c), d) and e) until the entire object has been manufactured;

g) cooling the assembly at the end of the complete manufacture of the object;

h) separating the manufactured object from the surrounding powder that has not been melted.

The present invention also relates to a three-dimensional object that can be manufactured according to the process described previously.

The combination of a polyvinylidene fluoride or of a vinylidene difluoride copolymer having a suitable viscosity and of the additivation of the PVDF powder with a hydrophobic silica enables the sintering of the PVDF powder with standard process parameters. For example, this makes it possible to use irradiation energy densities of the order of 25 to 45 mJ/mm$^2$ in a single scan for a Formiga P100 sintering machine from EOS. The parts obtained have a good geometry and satisfactory mechanical properties. The crystallinity and the molar masses of the PVDF are preserved at the end of the sintering process in the manufactured parts.

EXAMPLES

The following examples illustrate the invention without limiting it.

Products:

PVDF 1: Vinylidene difluoride homopolymer which has a melt viscosity, measured at 232° C. and 100 s$^{-1}$, of 250 Pa·s.

PVDF 2: Vinylidene difluoride homopolymer which has a melt viscosity, measured at 232° C. and 100 s$^{-1}$, of 450 Pa·s.

PVDF 3: Copolymer of vinylidene difluoride and hexafluoropropylene which has a melt viscosity, measured at 232° C. and 100 s$^{-1}$, of 550 Pa·s and a melting point, measured by thermal analysis, of 157° C.

Flow agent 1 (FA1): The flow agent FA1 is a fumed silica from Cabot sold under the name Cab-o-sil TS610. The surface was modified with dimethyldichlorosilane to give it a hydrophobic character. It has a diameter Dv50 of less than 20 μm.

Flow agent 2 (FA2): The flow agent FA2 is a hydrophilic fumed silica from Cabot sold under the name Cab-o-sil M5. It has a diameter Dv50 of less than 20 μm.

Flow agent 3 (FA3): The flow agent FA3 is a hydrophilic fumed silica from Evonik sold under the name Aerosil 150. It has a diameter Dv50 of less than 20 μm.

Flow agent 4 (FA4): The flow agent FA4 is a fumed aluminum oxide from Evonik sold under the name Aeroxide AluC. It has a diameter Dv50 of less than 20 μm.

Preparation of the PVDF Powders

Process 1: PVDF1 powders were prepared by two-step cryomilling with a Netzch CUM 150 mill. The first step consisted of cryogenic premilling of granules. For this step, the mill is equipped with pin disks 5 mm in diameter. The rotation speed of the disks is set at 14 000 rpm. The powder thus obtained is then cryomilled a second time on the same Netzch mill but equipped with a blast rotor and with a 100 μm grate in the milling chamber. Two powders with different particle size distributions were obtained by varying the rotor speed and the powder flow rate:

powder with a particle size distribution characterized by $D_v10=15$ $D_v50=50$ μm and $D_v90=140$ μm obtained with a rotor speed of 12 000 rpm and a flow rate of 5 kg/h.

powder with a particle size distribution characterized by $D_v10=15$ $D_v50=54$ μm and $D_v90=162$ μm obtained with a rotor speed of 10 000 rpm and a flow rate of 10 kg/h.

Process 2: PVDF1, PVDF2 and PVDF3 powders were prepared by cryomilling starting with granules using a counter-rotating pin mill. The granules are first passed once through the mill and the powder obtained is then passed twice more through the mill. The powders are then screened to 200 μm.

Process 3: A PVDF1 powder was prepared by two-step cryomilling with a Netzch CUM 150 mill. The first step consisted of cryogenic premilling of granules. For this step, the mill is equipped with pin disks 5 mm in diameter. The rotation speed of the disks is set at 14 000 rpm. The powder thus obtained is then cryomilled a second time with the same Netzch mill, but equipped with 3 mm pin disks. The powder thus obtained has a particle size distribution characterized by a Dv10 of 40 μm, a Dv50 of 108 μm and a Dv90 of 250 μm.

Process 4: A PVDF1 powder was prepared according to the same protocol as process 2, i.e. it was obtained by cryomilling of granules using a counter-rotating pin mill. The granules are first passed once through the mill and the powder obtained is then passed twice more through the mill. Following this cryomilling step, a selection step is performed on the powder to separate the fines and the coarse particles. Two types of powders are then obtained:
- a powder corresponding to the fraction of fine particles which has a particle size distribution characterized by a Dv10 of 11 μm, a Dv50 of 30 μm and a Dv90 of 60 μm
- a powder corresponding to the fraction of coarse particles which has a particle size distribution characterized by a Dv10 of 60 μm, a Dv50 of 90 μm and a Dv90 of 185 μm.

Characterization of the Properties of the PVDF Powders:

Particle size distribution: The particle size distribution was measured by the dry route using a Malvern Insitec System laser particle size analyzer.

Flowability: The flowability is evaluated according to the standard ISO 6186. This consists in measuring the flow time of a given amount of powder through a funnel, the outlet diameter of which is set at 25 mm. The shorter the time, the better the powder flows.

Density:

The "bulk" density of the powder was measured in the following manner A 250 ml graduated cylinder was filled with the powder. The exact volume and the mass are measured, from which the density is deduced. The "tapped" density was obtained by subjecting the cylinder, previously filled for the measurement of the bulk density, to a series of controlled vertical impacts (amplitude, frequency).

Characterization of the Test Specimens after Sintering

Degradation of the PVDF in the Sintered Test Specimens:

The degradation of the PVDF was evaluated by measurement of the molar masses by GPC and estimation of a content of gel/insolubles.

GPC Analysis:

The molar masses before and after passing through the machine were measured by GPC using a Waters analysis chain equipped with a P600 pump, a Wisp 717Plus injector and a Waters 2414 RID refractometer detector. The temperature of the columns is regulated at 50° C. The sample to be analyzed is dissolved in DMSO+0.1 M NaNO$_3$ at a concentration of 2 g/l over 4 h at 95° C. The solution is then filtered using an Acrodisc GHP polypropylene filter with a diameter of 25 mm and a porosity of 0.45 μm. The masses are expressed as PMMA equivalent. The insoluble fraction is estimated by comparing the intensity of the signal of the refractometer to that of a completely soluble PVDF.

Wide-Angle X-Ray Diffraction Analysis:

The crystallinity of the test specimens after sintering and of the PVDF powder before sintering was evaluated by wide-angle X-ray diffraction using an Inel diffraction bed. The diffraction spectra were recorded under the following conditions:

Wavelength: main Kα1 line of copper (1.54 angströms).

Power of the generator: 40 kV-25 mA

Observation mode: transmission

Counting time: 3000 s 1D curve detector

The degree of crystallinity was evaluated from the amorphous/crystal decomposition using the Fityk software. From the crystal/amorphous decomposition performed on the spectra, a degree of crystallinity may be estimated:

χc (%)=integrated intensity of the crystalline lines/total integrated intensity (crystalline+amorphous). This corresponds to the mass proportion of crystalline phase in the product.

The crystallinity index is dependent on the decomposition of the spectrum, which is why the degrees of crystallinity determined by X-ray diffraction are not necessarily absolute crystallinity values, but make it possible to compare products when the same model of decomposition of the spectrum is used, which is the case here.

Flow Properties of the PVDF1 Powder Milled According to Process 1 as a Function of the Nature of the Flow Agent:

The PVDF1 powder milled according to process 1 and having a particle size distribution characterized by $D_v10=15$ μm, $D_v50=50$ μm and $D_v90=140$ μm was mixed, respectively, with the flow agents FA1, FA2, FA3 or FA4 in a proportion of 0.2% by weight using a Magimix food processor type mixer at high speed for 110 seconds.

The properties of the PVDF1 powder milled according to process 1 are given in Table 1.

TABLE 1

| Nature of the PVDF1 powder | Nature and content of the flow agent | Flow time (s) | Bulk density | Tapped density |
| --- | --- | --- | --- | --- |
| PVDF1 powder milled according to process 1 | No flow agent | Does not flow | 0.651 | 0.905 |
| | 0.2% FA1 (hydrophobic silica) | 7 s | 0.726 | 0.955 |
| | 0.2% FA2 (hydrophilic silica) | Does not flow | 0.651 | 0.815 |
| | 0.2% FA3 (hydrophilic silica) | Does not flow | 0.641 | 0.842 |
| | 0.2% FA4 (aluminum oxide) | Does not flow | 0.681 | 0.872 |

The hydrophobic silica enables the powder to flow through the orifice of the funnel. In this test, a flow time of 7 seconds is considered to be a sign of very good flowability. Without silica or additivated with hydrophilic silicas FA2 or FA3 or with aluminum oxide AluC, the PVDF powder does not flow and cannot be used as is in the sintering process due to this poor flowability.

Passage of the PVDF1 Powder Milled According to Process 1 and Additivated with Hydrophobic Silica FA1 Through a Sintering Machine:

Tensile test specimens of ISO 527 1BA and 1A type were produced by sintering using the milled PVDF 1 powder according to process 1 with a Formiga P100 laser sintering machine from EOS. A rounded-edged recoater (ref.: 12130109) was used. The conditions for passage through the machine were the following:

Contour speed=1500 mm/s
Hatching speed=2500 mm/s
"Beam offset" hatching=0.15 mm.

The operating conditions are summarized in table 2 below:

TABLE 2

| Temperature of the exposure chamber (° C.) | Temperature of the shrinkage chamber (° C.) | Energy density (mJ/mm$^2$) | Laser power (W) |
| --- | --- | --- | --- |
| 152° C. | 135° C. | 35 | 13.13 |
| 152° C. | 135° C. | 40 | 15 |
| 152° C. | 135° C. | 43 | 16.125 |

The characterization of the PVDF composition according to the invention according to the GPC method made it possible to obtain the results given in Table 3.

TABLE 3

| | Temperature of the exposure chamber (° C.) | Energy density (mJ/mm$^2$) | Mn (g/mol) | Mw (g/mol) | Refracotometric signal K(RI) | Fraction of insolubles |
| --- | --- | --- | --- | --- | --- | --- |
| PVDF1 powder milled according to process 1 | — | — | 82300 | 219000 | 87.8 | 0% |
| ISO527-1BA test specimen sintered using PVDF1 powder milled according to process 1 | 152° C. | 43 | 81300 | 220200 | 88.4 | 0% |

These results show that no degradation of the PVDF1, evaluated with respect to the size of the PVDF1 chains or to the presence of insolubles, was observed by GPC.

Characterization of the composition according to the invention of PVDF1 before and after laser sintering according to the X-ray diffraction method indicated above made it possible to obtain the results given in Table 4.

TABLE 4

| | Temperature of the exposure chamber (° C.) | Energy density (mJ/mm$^2$) | Degree of crystallinity measured in X-ray diffraction (%) |
| --- | --- | --- | --- |
| PVDF1 powder milled according to process 1 | — | — | 30% |
| ISO527-1BA test specimen sintered using PVDF1 powder milled according to process 1 | 152° C. | 43 | 32% |

These results show that the degree of crystallinity of the PVDF1 in the sintered test specimen is comparable to that of the PVDF1 powder before sintering. Thus, this shows that the ability of the PVDF1 to crystallize was conserved after passing through the laser sintering machine.

Passage of Powders Based on PVDF1, PVDF2 and PVDF3 Through a Sintering Machine:

Tensile test specimens of ISO 527 1BA type were produced by sintering using PVDF powders according to the invention with a Formiga P100 laser sintering machine from EOS. A rounded-edged recoater (ref.: 12130109) was used. The powders were additivated with flow agents FA1, FA3 or FA4 in a proportion of 0.2% by weight using a Magimix food processor type mixer at high speed for 110 seconds. The conditions for passage through the machine were the following:

Contour speed=1500 mm/s
Hatching speed=2500 mm/s
"Beam offset" hatching=0.15 mm.

Various energy density levels were applied ranging from 30 mJ/mm2 to 43 mJ/mm2 These laser energy densities were obtained by varying the laser power.

For each PVDF powder, different exposure chamber temperatures and shrinkage chamber temperatures were applied. The sintering window of the PVDF powders was thus determined. It is defined in the present case as the temperature range of the exposure window which makes it possible to construct, without encountering any problems, test specimens of ISO 527-1BA type which do not have any major geometrical defects.

Two main construction and/or geometrical defects of the parts are observed and make it possible to define the "sintering window":

When the exposure chamber temperature is too low, the edges of the first sintered layers have a tendency to rise above the PVDF crystallization powder bed, so much so that they are carried away by the "recoater" during the deposition of the next layer of "fresh" powder. The construction must then be stopped. The temperature of the exposure chamber just before the appearance of this problem is defined as the lower limit of the sintering window.

When the exposure chamber temperature is too high, the flowability of the powder becomes very poor and the powder has a strong tendency to agglomerate. This is reflected by poor filling of the molds during the deposition of a fresh layer of powder, the appearance of cracks in the powder bed and at the surface of the parts and/or strong agglomeration of the powder at the surface of the parts. The temperature of the exposure chamber just before the appearance of this problem is defined as the upper limit of the sintering window.

For the laser sintering process, it is sought to have a powder which has the widest possible sintering window. Table 5 shows the impact of the particle size distribution on the width of the sintering window for the manufacture of test specimens of ISO 527 1BA type. According to examples 1 to 4 of the invention, this window ranges from 2° C. to 9° C. However, when the fraction of "coarse particles", characterized by the Dv90, is too high and/or when the fraction of fine particles is too low, characterized by the Dv10, the sintering window becomes zero. It is no longer possible to construct parts without encountering prohibitive problems such as the carrying away of the parts during manufacture by the recoater during the deposition of a fresh layer of powder or very strong agglomeration of the powder at the surface of the parts. This is what happens in the case of the invention when the Dv10 becomes greater than or equal to 50 μm and/or when the Dv90 becomes greater than or equal to 200 μm. According to comparative example 1, the PVDF1 powder milled according to process 3 and having a particle size distribution characterized by Dv10=40 μm, Dv50=108 μm and Dv90=250 μm does not make it possible to construct test specimens of ISO 527 1BA type. Irrespective of the exposure chamber temperature, the sintered PVDF layers are carried away by the recoater during the deposition of the next layer of "fresh" powder, which does not make it possible to go up to the end of the part construction "run". The same type of problem is encountered in the case of comparative example 2.

TABLE 5

| | Flow agent | $D_v 10$ | $D_v 50$ | $D_v 90$ | Lower limit of the sintering window (° C.) | Upper limit of the sintering window (° C.) | Width of the sintering window (° C.) |
|---|---|---|---|---|---|---|---|
| Example 1: PVDF1 powder obtained according to process 2 | 0.2% FA1 | 15 | 50 | 111 | 148 | 152 | 4 |
| Example 2: PVDF2 powder obtained according to process 2 | 0.2% FA1 | 17 | 57 | 128 | 142 | 150 | 8 |
| Example 3: PVDF3 powder obtained according to process 2 | 0.2% FA1 | 17 | 53 | 118 | 128 | 137 | 9 |
| Example 4: PVDF1 powder obtained according to process 1 | 0.2% FA1 | 15 | 54 | 162 | 152 | 154 | 2 |
| Comparative Example 1: PVDF1 powder obtained according to process 3 | 0.2% FA1 | 40 | 108 | 250 | Sintering of ISO 527-1BA test specimens impossible | | |
| Comparative Example 2: PVDF1 powder obtained according to process 4 | 0.2% FA1 | 60 | 90 | 185 | Sintering of ISO 527-1BA test specimens impossible | | |
| Comparative Example 3: PVDF1 powder obtained according to process 1 | 0.2% FA3 | 15 | 54 | 162 | Sintering of ISO 527-1BA test specimens impossible | | |

TABLE 5-continued

|  | Flow agent | $D_v10$ | $D_v50$ | $D_v90$ | Lower limit of the sintering window (° C.) | Upper limit of the sintering window (° C.) | Width of the sintering window (° C.) |
|---|---|---|---|---|---|---|---|
| Comparative Example 4: PVDF1 powder obtained according to process 1 | 0.2% FA4 | 15 | 54 | 162 | Sintering of ISO 527-1BA test specimens impossible | | |

Furthermore, according to comparative examples 3 and 4, the flowability of the PVDF1 powders milled according to process 1 and additivated with 0.2% by weight of hydrophilic silica or aluminum oxide as flow agent is insufficient to allow the manufacture of ISO 527 1BA test specimens, irrespective of the exposure chamber temperature.

The invention claimed is:

1. A composition comprising a thermoplastic fluoropolymer powder and a hydrophobic flow agent, in which the fluoropolymer powder has a particle size defined by a Dv50 of between 25 and less than or equal to 120 um, a Dv90 of less than or equal to 200 μm and a Dv10 of less than or equal to 25 μm, wherein said hydrophobic flow agent is selected from the group consisting of: precipitated silicas, fumed silicas, vitreous silicas, and pyrogenic silicas.

2. The composition of claim 1, in which the fluoropolymer is a homopolymer or a copolymer comprising at least one monomer selected from the group consisting of: vinyl fluoride; vinylidene fluoride; trifluoroethylene; chlorotrifluoroethylene; 1,2-difluoroethylene; tetrafluoroethylene; hexafluoropropylene; perfluoro (alkyl vinyl) ethers; perfluoro (1,3-dioxole); perfluoro (2,2-dimethyl-1,3-dioxole); the product of formula CF2-CFOCF2CF(CF3)OCF2CF2X in which X is SO2F, CO2H, CH2OH, CH2OCN or CH2OPO3H; the product of formula CF2=CFOCF2CF2SO2F; the product of formula F(CF2)nCH2OCF=CF2 in which n is 1, 2, 3, 4 or 5; the product of formula R1CH2OCF=CF2 in which R1 is hydrogen or F(CF2)m and m is equal to 1, 2, 3 or 4; the product of formula R2OCF=CH2 in which R2 is F(CF2)p and p is 1, 2, 3 or 4; perfluorobutyl ethylene (PFBE); 3,3,3-trifluoropropene and 2-trifluoromethyl-3,3,3-trifluoro-1-propene.

3. The composition of claim 1, in which said fluoropolymer is a polymer comprising units derived from vinylidene fluoride, and is chosen from polyvinylidene fluoride homopolymer and copolymers comprising at least 75 mol % of units derived from vinylidene fluoride and the remainder of the units derived from at least one other comonomer chosen from: vinyl fluoride; trifluoroethylene; chlorotrifluoroethylene; 1,2-difluoroethylene; tetrafluoroethylene; hexafluoropropylene; perfluoro (alkyl vinyl) ethers; perfluoro (1,3-dioxole); perfluoro (2,2-dimethyl-1,3-dioxole), and mixtures thereof.

4. The composition of claim 1, in which said fluoropolymer is chosen from the group consisting of copolymers of ethylene and chlorotrifluoroethylene, of ethylene and tetrafluoroethylene, of hexafluoropropylene and tetrafluoroethylene, of tetrafluoroethylene and a monomer from the family of perfluoro (alkyl vinyl) ethers.

5. The composition of claim 1, in which said fluoropolymer has a viscosity of less than or equal to 1600 Pa·s measured at a temperature of 232° C. and at a shear rate of 100 s$^{-1}$ according to the standard ASTM D3825.

6. The composition of claim 1, in which the fluoropolymer powder has a particle size defined by a Dv90 of less than or equal to 150 μm.

7. The composition of claim 1, in which said fluoropolymer has a number-average molecular mass ranging from 5 kDa to 200 kDa.

8. The composition of claim 1, in which the weight proportion of flow agent is between 0.01% and 5% of the total weight of the composition.

9. The composition of claim 1, consisting of a fluoropolymer and a hydrophobic flow agent.

10. The composition of claim 1, further comprising up to 50% by weight of one or more additives selected from the group consisting of dyes, pigments for coloring, pigments for infrared absorption, carbon black, fire-retardant additives, glass fibers, carbon fibers, antioxidant stabilizers, light stabilizers, impact modifiers, antistatic agents and flame retardants.

11. A process for manufacturing a three-dimensional object, said process comprising the steps of providing the composition of claim 1 in powder form, laser sintering said composition in powder form to obtain a three-dimensional object.

12. A three-dimensional object obtained by the process of claim 1.

13. The composition of claim 1, wherein said flow agent is a hydrophobic fumed silica.

14. The composition of claim 1, in which the fluoropolymer powder has a particle size defined by a Dv50 of between 25 and 100 micrometers.

15. The composition of claim 1, in which the weight proportion of flow agent is between is between 0.01% and 0.2% of the total weight of the composition.

* * * * *